April 21, 1942.   F. H. SHEPARD, JR   2,280,725
SELF-BALANCING CAPACITY ALTIMETER
Filed Nov. 30, 1938
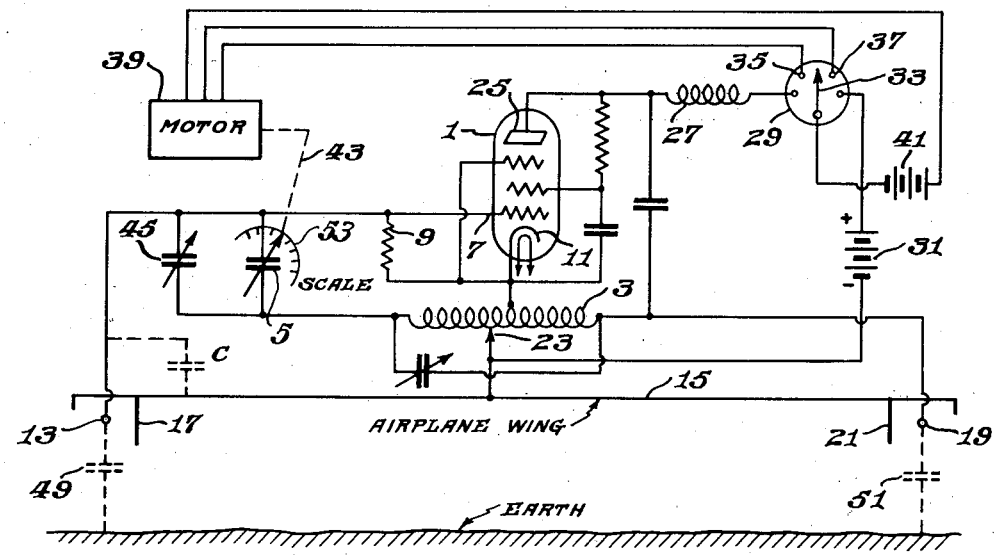
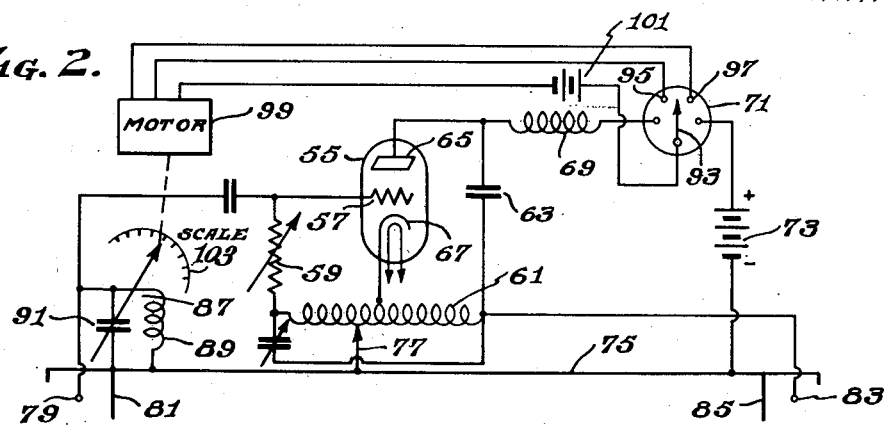
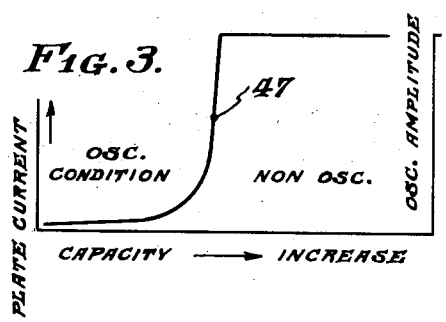
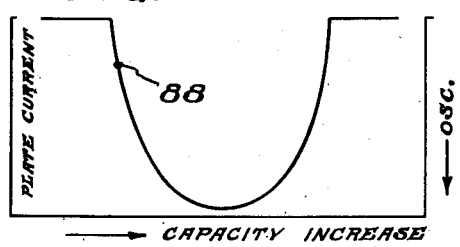
Inventor
Francis H. Shepard, Jr.
By
Attorney Patented Apr. 21, 1942

2,280,725

UNITED STATES PATENT OFFICE 2,280,725

SELF-BALANCING CAPACITY ALTIMETER

Francis H. Shepard, Jr., Merchantville, N. J., assignor to Radio Corporation of America, a corporation of Delaware Application November 30, 1938, Serial No. 243,171

4 Claims. (Cl. 177—352)

This invention relates to altimeters which depend upon an electrical network which is balanced and, more especially, to a capacity bridge type altimeter in which the bridge is self-balanced.

Various types of electrically operated altimeters have been proposed. One of the proposed types depends upon the balancing of a capacity bridge. When such altimeters are installed on aircraft, it is customary to arrange the plates of a capacitor forming one element of the bridge adjacent the wing tips of the plane. Each plate will have a capacity to earth which will vary as a function of the altitude, so that the altitude may be indicated as a function of the capacity required to balance the bridge. In general, altimeters of this type have proven either insensitive to small changes in capacity or the altimeter has been so sensitive that slight capacity changes within the plane cause false indications. It is one of the objects of this invention to provide means whereby the altitude of an aircaft may be determined by means of a capacity bridge which is self-balancing. Another object is to provide means for adjusting a capacity bridge so that it will be sensitive to changes in altitude but insensitive to small changes in the elements which make up the bridge. A still further object is to provide means for determining the altitude of an aircraft as a function of change of a resonant circuit.

The invention will be described by reference to the accompanying drawing in which Figure 1 is a schematic circuit diagram of a preferred embodiment of the invention; Figure 2 is a schematic circuit diagram of a modification of the invention, and Figures 3 and 4 are graphs which are used to illustrate the respective operations of the circuits.

Referring to Fig. 1, a thermionic tube 1 has, as its input circuit, a portion of the inductance coil 3 which is connected through a capacitor 5 to the grid electrode 7. The grid electrode is connected through a grid leak 9 to the cathode 11. The cathode is connected to a point intermediate the ends of the inductor 3. The grid is also connected to an antenna 13 which is mounted adjacent the wing tips of an airplane wing which may be represented by the line 15. It is assumed that the airplane wing is conductive, although the invention is not limited to any particular form of wing. The antenna 13 is shielded at 17 from a complementary antenna 19 which is mounted on the opposite wing tip and is correspondingly shielded at 21. The complementary antenna 19 is connected to the terminal of the inductor 3 remote from the grid circuit connection. The airplane wing is connected to a balanced point 23 on the inductor 3, as will be hereinafter described.

The anode 25 of the thermionic tube is connected through a radio frequency choke 27 through a relay type meter 29 and a B battery 31. The negative terminal of the battery is connected to the balancing point 23. The relay meter 29 includes a movable element 33 which is arranged to contact fixed points 35, 37. The fixed points are connected to a reversible motor 39. The movable contact 33 is connected through a battery or other suitable source of power 41 to the motor. The movable element of the motor 39 is connected through suitable means 43 which may include reduction gearing to the rotatable shaft of the capacity 5. A vernier capacitor 45 may be connected in shunt with the variable capacitor 5.

The operation of the foregoing circuit is essentially as follows: The thermionic tube and associated circuit elements represent an oscillation generator. The operating parameters of the tube are adjusted to obtain an oscillation characteristic which may be plotted against the plate current of the tube as shown in Fig. 3. It will be seen from an inspection of Fig. 3 that the plate current falls very rapidly when the tube is oscillating and, after reaching a predetermined value, remains substantially constant. The initial adjustment is to set the tube into oscillation with the airplane wing located at a fixed distance above the earth. While in this position, the balancing contact 23 is moved back and forth along the inductor 3 until a point is located at which the effect of the stray capacity at C upon the anode current of the thermionic tube will be balanced out.

After the balance point is thus determined, the anode current is preferably adjusted so that the steady oscillatory state occurs just at the point of oscillation, that is about the center 47 of the vertical portion of the characteristic curve. If the relay meter 29 is arranged so that the movable contact 33 is intermediate fixed contacts 35, 37, there will be no change in conditions until the airplane wing is moved with respect to earth. The effect of such movement will be to increase or decrease, as the case may be, the capacities 49, 51, which exist between the antennas 13, 19 and the earth. This change of capacity will increase or decrease the plate current. The change in plate current thus produced actuates the relay 29 and thereby closes one of the circuits to the motor. The motor in turn operates the capacity 5 to rebalance the circuit. The variable capacity 5 may include a scale 53 which may be calibrated in terms of altitude above the nearest wave reflector or reradiator. It is a characteristic of this type of altimeter that the sensitivity is greatest for low altitudes. By low altitudes, less than 300 feet is meant.

In the modified circuit of Fig. 2, a thermionic tube 55 is connected as follows: Grid 57 is connected through a resistor 59 to one terminal of an inductor 61; the other terminal of the inductor is connected through a capacitor 63 to the anode 65; the cathode 67 is connected to a point intermediate the terminals of the inductor 61. The anode is also connected through a radio frequency choke coil 69, a relay type meter 71 and B battery 73 to an airplane wing 75 which is represented as conductive. The airplane wing is connected to an adjustable lead 77 which is arranged to contact the inductor 61 at a balance point. The grid 57 is connected to an antenna 79, which is located adjacent the wing tips and is shielded 81 from a complementary antenna 83 which is likewise shielded 85 and located at the opposite wing tip. The first-mentioned antenna 79 is connected through a resonant circuit 87, which includes an inductor 89 and a variable capacitor 91. The second-mentioned antenna is connected to the junction of the inductor 61 and the capacitor 63.

The relay type meter 71 includes a movable contact 93 and a pair of fixed contacts 95, 97. The fixed contacts are suitably connected to a reversible motor 99, while the movable contact is connected through a battery 101 to the motor. The armature of the motor is connected to the rotatable shaft of the variable capacitor 91. This shaft may be provided with a pointer and scale 103 to indicate altitude.

The operation of the circuit shown in Fig. 2 is essentially as follows: The resonant circuit 87 is adjusted so that oscillations are established. The amplitude of the oscillations is preferably adjusted so that the steady or constant state corresponds to the point 88 on the curve of Fig. 4. As the capacity between the antennas 79, 83 is varied, the amplitude of the oscillations varies as a function of the variation of capacity. The change in the oscillations is accompanied by changes in plate current which acts on the relay meter 71. The relay closes the contacts in the motor circuit to thereby adjust the variable capacitor 91 which tunes the resonant circuit. Thus, any tendency to change the oscillatory currents is accompanied by compensating change in the resonant circuit. It will be seen that a steady oscillatory state is maintained notwithstanding the variation of altitude. If a scale 103 is associated with the motor and resonant circuit adjustment, a calibration may be made to indicate the altitude as a function of the circuit characteristics.

Thus, the invention has been described as a balanced capacity altimeter in which self-balancing is effected. The change in capacity which is a function of the altitude is arranged to unbalance the network so that the thermionic tube connected to the circuit oscillates more or less strongly to thereby produce changes in anode current. The changes in anode current are used to control the rebalancing of the bridge. It should be understood that, while the circuits have been represented as including a relay and a separate motor, the relay meter movement may be used to adjust the capacity until a rebalance is effected. In the circuits shown, single stages are employed. It should be understood that multistage amplifiers may be used either in the oscillator circuit itself, to amplify the changes in oscillatory current, to amplify the rectified oscillatory currents, or to amplify the direct changes in plate current.

The use of lumped constants in the oscillatory circuits is shown by way of illustration. It should also be understood that metal elements of the airplane structure may be substituted for inductors, capacitors, or like elements.

I claim as my invention:

1. An altimeter including an oscillator, a pair of capacitors connected to said oscillator for varying the amplitude of oscillation thereof, the capacity of one of said capacitors being a function of its altitude above ground, the capacity of the other of said capacitors being variable, means responsive to a change in the amplitude of oscillation due to a change in said one capacitor for varying said other capacitor to produce an effect on the amplitude of oscillation equal and opposite to the effect produced by said change in said one capacitor, and means for indicating said altitude as a function of the capacity of said variable capacitor.

2. An altimeter including a thermionic oscillator, a pair of capacitors connected to said oscillator for varying the amplitude of said oscillations, the effective capacity of one of said capacitors being a function of the distance of said capacitor from ground, the other capacitor being variable, means responsive to a change in the initial amplitude of said oscillations due to a change in said effective capacity for varying said other capacitor an amount sufficient to restore said oscillations to said initial amplitude, and means for indicating said altitude as a function of the capacity variation of said other capacitor.

3. An altimeter including in combination an oscillator, a variable capacitor in circuit with said oscillator for varying the amplitude of the oscillatory current thereof, said variable capacitor being calibrated as a function of altitude, a second capacitor whose capacity varies as a function of altitude for also varying the amplitude of said oscillatory current, and means responsive to a change in altitude which produces a corresponding change in the amplitude of said oscillatory current for varying said first capacitor to produce an effect on the amplitude of said plate current equal and opposite to the effect produced by said change in altitude.

4. In an aircraft altimeter comprising a thermionic tube having input and output circuits, means adjustably coupling said circuits in proper phase to produce sustained oscillations therein, antenna means coupled to each of said circuits, said adjustable coupling means being adjusted to cause said tube to operate normally at the point of oscillation, said antenna means providing a capacity to ground which is a function of the altitude of said aircraft above ground, means responsive to a change in the plate current of said tube due to a change in said antenna to ground capacity for producing an equal and opposite change in said adjustable coupling means whereby said plate current is maintained constant, and calibrated means for indicating the altitude of said aircraft as a function of the change in said adjustable coupling means.

FRANCIS H. SHEPARD, JR.